United States Patent [19]
Ogawa

[11] Patent Number: 5,740,474
[45] Date of Patent: Apr. 14, 1998

[54] APPARATUS FOR ELIMINATING BACKLASH IN A ZOOM FINDER

[75] Inventor: Yuji Ogawa, Tokyo, Japan

[73] Assignee: Asahi Kogaku Kogyo Kabushiki Kaisha, Tokyo, Japan

[21] Appl. No.: 803,152

[22] Filed: Feb. 19, 1997

[30] Foreign Application Priority Data

Feb. 20, 1996 [JP] Japan .................................. 8-032367

[51] Int. Cl.$^6$ .............................. G03B 5/00; G03B 13/04; G03B 15/03; G03B 17/04
[52] U.S. Cl. .................. 396/62; 396/84; 396/349
[58] Field of Search .............................. 396/62, 84, 379, 396/349

[56] References Cited

U.S. PATENT DOCUMENTS 4,936,664  6/1990  Haraguchi et al. .
4,944,030  7/1990  Haraguchi et al. .
5,335,030  8/1994  Suzuka .

Primary Examiner—W. B. Perkey
Attorney, Agent, or Firm—Greenblum & Bernstein, P.L.C.

[57] ABSTRACT

An apparatus for eliminating a backlash in a zoom finder of a zoom lens camera. A cam member is provided with a cam surface that is engaged with movable variable power lens of the finder. The cam member is driven in association with the zoom-photographing lens, and the cam surface is provided with a zoom section as well as a transfer section in which no movement of the movable variable power lens occurs. A backlash eliminating cam surface is provided separately from the cam surface on the cam member for the movable variable power lens. An oblique cam surface is provided on the backlash eliminating cam surface and is inclined with respect to a plane perpendicular to the optical axis of the movable variable power lens. The oblique cam surface is formed in a section corresponding to the zoom section side of the transfer section of the cam surface. A backlash eliminating member is biased and pressed against the oblique cam surface to exert a drive force on the cam member.

5 Claims, 3 Drawing Sheets

APPARATUS FOR ELIMINATING BACKLASH IN A ZOOM FINDER

BACKGROUND OF THE INVENTION

1. Field of the Invention

The present invention relates to a zoom finder of a zoom compact camera, and more particularly relates to an apparatus for eliminating backlash withing a zoom finder mechanism.

2. Description of the Related Art

Conventionally, zoom compact are camera provided with a zoom finder which varies the field of view in association with a movement of a zoom-photographing lens. In the zoom finder, a movable zoom lens (movable variable power lens) which is supported to move in an optical axis direction, is moved to a predetermined position by a cam member which is driven in association with the movement of the zoom-photographing lens.

In general, a cam surface of the cam member is provided with a zoom section and a transfer section. The zoom section corresponds to a zooming section of the zoom-photographing lens in which the axial position of the movable variable power lens is varied. The transfer section corresponds to a transfer section of the zoom-photographing lens and extends from the zooming section to a retracted position where no movement of the movable variable power lens occurs. Since the cam member is driven in association with the movement of the zoom-photographing lens, backlash is inevitably produced in a gear mechanism or the like. The movement of the cam member due to the backlash tends to occur when the cam member (cam surface) moves from the transfer section to the zoom section during which a force in a direction perpendicular to the optical axis of the movable variable power lens is exerted on the cam member. The large movement of the movable variable power lens disturbs the field of view of the zoom finder.

SUMMARY OF THE INVENTION

It is an object of the present invention to provide a backlash eliminating apparatus in which no accidental or unintended movement of the movable variable power lens occurs due to the backlash of the cam member.

The basic concept of the present invention resides in that if the backlash of the cam member is eliminated before the cam surface of the cam member for the movable variable power lens transfers from the transfer section to the zooming portion, no accidental displacement of the movable variable power lens of the zoom finder occurs.

According to an aspect of the present invention, there is provided an apparatus for eliminating a backlash in a zoom finder having a zoom-photographing lens which is movable between a zoom photographing section and a transfer section defined between the zoom photographing section and an accommodation position. A zoom finder is provided having at least one movable variable power lens which is supported to move in the optical axis direction. A cam member is provided with a cam surface engaged with the movable variable power lens and which is driven in association with the zoom-photographing lens. The cam surface is provided with a zoom section which corresponds to the zoom photographing section of the zoom-photographing lens, to vary the axial position of the movable variable power lens, and a transfer section corresponding to the transfer section of the zoom-photographing lens, where no movement of the movable variable power lens occurs. A backlash eliminating cam surface is provided separate from the cam surface on the cam member for the movable variable power lens. An oblique cam surface is provided on the backlash eliminating cam surface that is inclined with respect to a plane perpendicular to the optical axis of the movable variable power lens. The oblique cam surface is formed in a section corresponding to the zoom section side in the transfer section of the cam surface. A backlash eliminating member is continuously biased and pressed against the oblique cam surface to exert a drive force on the cam member in a direction perpendicular to the optical axis of the movable variable power lens.

Not only can the backlash eliminating cam surface of the cam member be independently or separately provided, but also it can be made of a zoom strobe cam surface which is adapted to move the illumination angle varying member of a zoom strobe device. The backlash eliminating member can be made of the illumination angle varying member.

The present invention can be applied to any cam member, for example, a rotatable cylindrical cam.

According to another aspect of the present invention, an apparatus for eliminating backlash in a zoom finder of a zoom lens camera is providing having a zoom finder having at least a pair of movable variable power lenses that are supported to move in an optical axis direction. A cylindrical cam is provided with a pair of cam surfaces that are engaged with the pair of movable variable power lenses and a backlash eliminating cam surface separate from the pair of cam surfaces for the movable variable power lenses. The cylindrical cam is rotated in association with a zooming operation of the zoom lens camera. Each of the pair of cam surfaces is provided with a zoom section to vary an axial position of the corresponding movable variable power lens, and a transfer section in which no movement of the movable variable power lenses occurs. The backlash eliminating cam surface is provided with an oblique cam surface that is inclined with respect to a plane perpendicular to the optical axis of the movable variable power lenses. The oblique cam surface is formed in a section corresponding to the zoom section side in the transfer section of the cam surface. A backlash eliminating member is continuously biased and pressed against the oblique cam surface to exert a rotational drive force on the cylindrical cam in a direction perpendicular to the optical axis of the movable variable power lens.

The present disclosure relates to subject matter contained in Japanese Patent Application No. 8-32367 (filed on Feb. 20, 1996) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
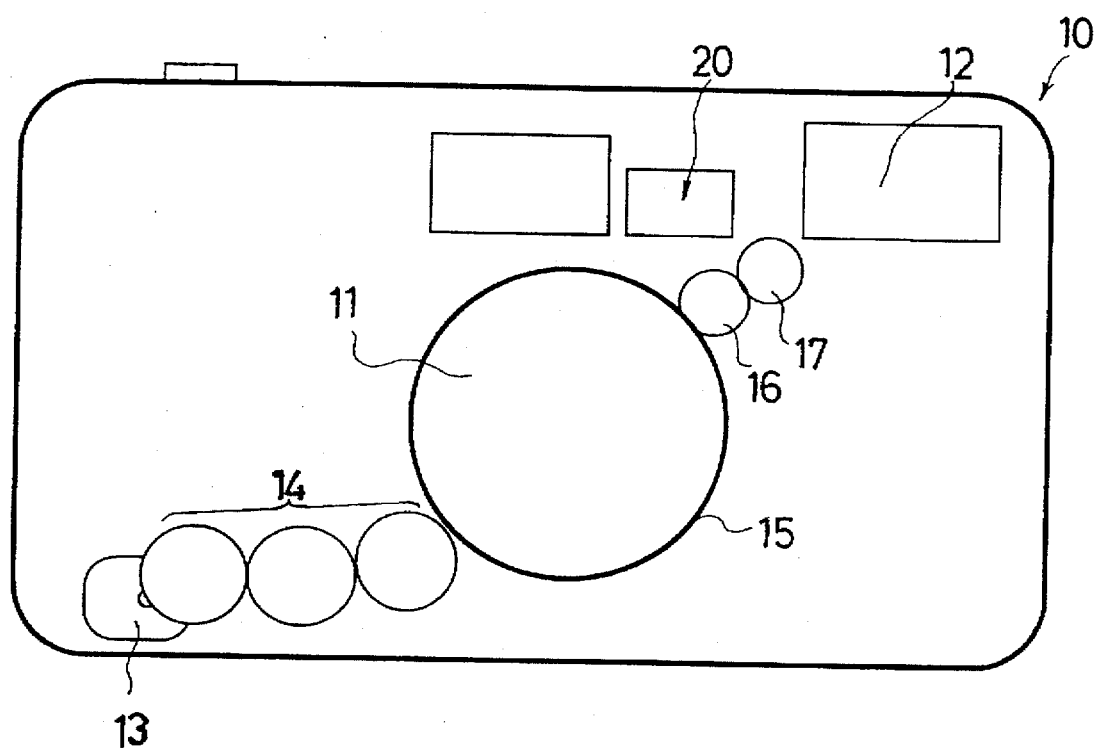
FIG. 1 is a front elevational view of a zoom compact camera having a zoom finder according to the present invention.

As viewed in FIG. 1 a zoom compact camera 10 is provided on a substantially central portion thereof with a zoom-photographing lens 11. A zoom strobe device 12 is provided on an upper right portion of the front surface of the camera body, and a zoom finder 20 is provided on the left side of the zoom strobe device 12.

A rotation of a drive motor 13 is transmitted to the zoom-photographing lens 11 through a gear train 14, and is also transmitted to a cylindrical cam 17 through an outer peripheral gear 15 of the zoom-photographing lens 11 and a transmission gear 16. The cylindrical cam 17 simultaneously drives the zoom strobe device 12 and the zoom finder 20.

Figure 2:
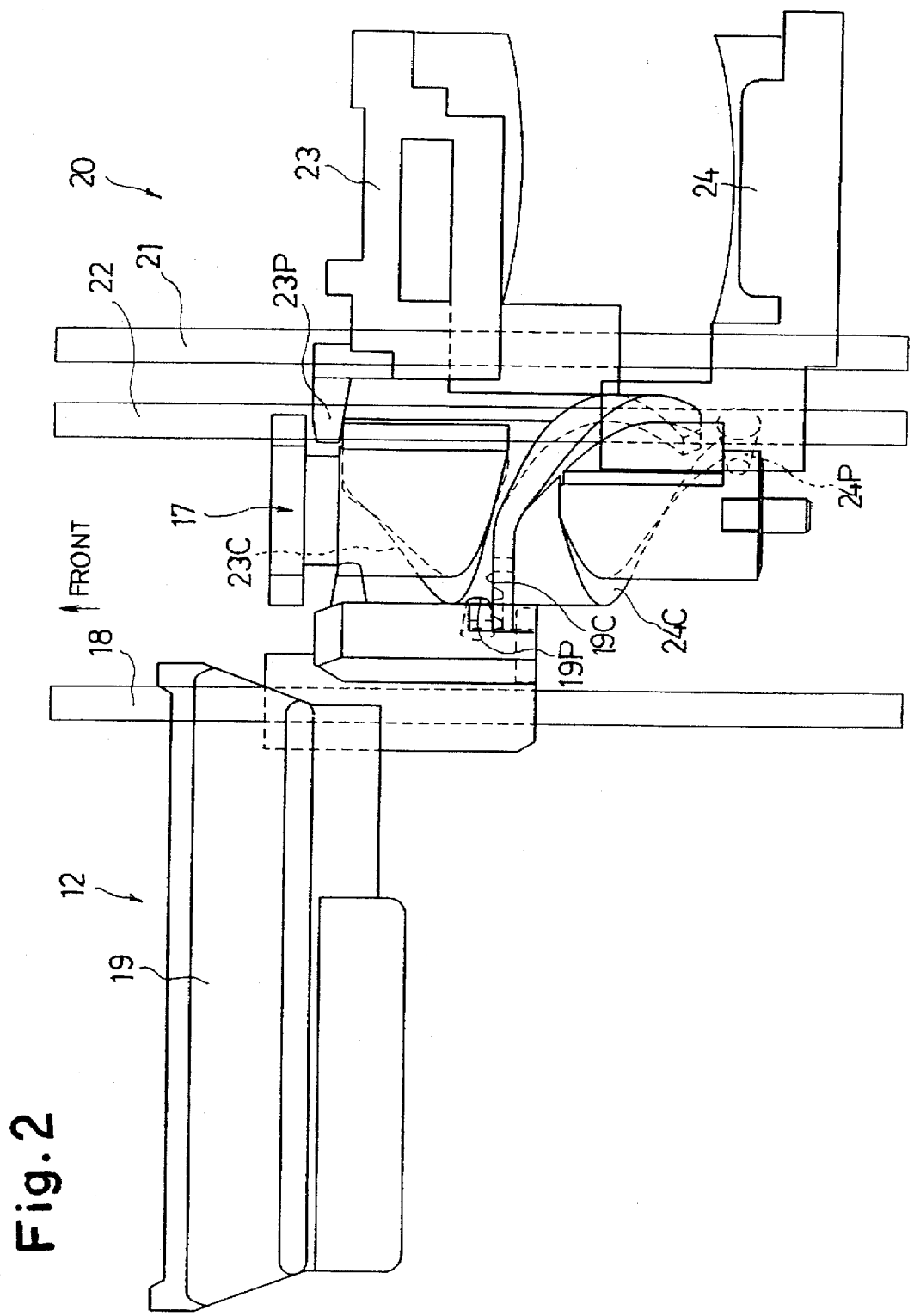
FIG. 2 is a plan view of a cam drive mechanism of a zoom strobe device and a zoom finder; and, FIG. 3 is a developed view of a cylindrical cam of the cam drive mechanism shown in FIG. 2.

The cylindrical cam 17 is constructed as shown in FIG. 2. The zoom strobe device 12, the zoom finder 20 and the cylindrical cam 17 are assembled into a finder/strobe assembly which is incorporated in the zoom compact camera 10 together with the zoom photographing lens 11, etc.

The zoom strobe device 12 is provided with a light emission block 19 which is guided by a guide rail 18 to linearly move forward and backward to vary the strobe emission angle (illumination angle) of the strobe device 12. The light emission block 19 constitutes an illumination angle varying member, per se known, having an integral light emitter and a reflector (both not shown).

The zoom finder 20 is provided with movable variable power lenses (lens frames) 23 and 24 which are guided to linearly move in an optical axis direction along guide rails 21 and 22. The cylindrical cam 17 is adapted to move the light emission block 19 and the movable variable power lenses 23, 24 to predetermined positions in association with the zoom-photographing lens 11. The cylindrical cam 17 is provided with cylindrical cam surfaces 19C, 23C and 24C for the light emission block 19 and the movable variable power lenses 23 and 24, respectively. The light emission block 19 and the movable variable power lenses 23 and 24 are provided with integral cam followers, in the form of projections 19P, 23P and 24P that engage with the respective cam surfaces 19C, 23C and 24C. The light emission block 19 and the movable variable power lenses 23 and 24 are biased by respective springs (not shown) to press the projections (cam followers) 19P, 23P and 24P against the corresponding cam surfaces 19C, 23C and 24C.

Figure 3:
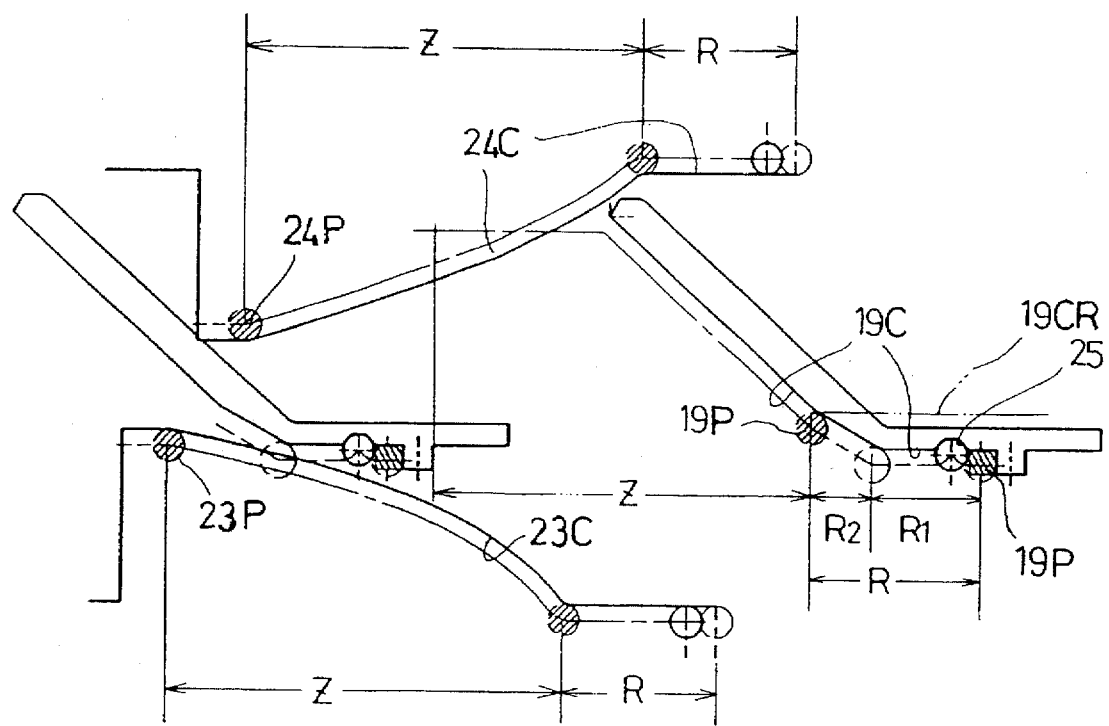

The cylindrical cam surfaces 19C, 23C and 24C are each provided with a zoom section Z and a transfer section R to transfer from the zoom section to the accommodation section, as seen in FIG. 3 (developed view). The zoom section Z corresponds to the zoom-photographing position of the zoom-photographing lens 11, in which the positions of the light emission block 19 and the movable variable power lenses 23, 24 are varied to vary the strobe emission angle and the field of view of the finder to correspond to the photographing focal length of the zoom-photographing lens 1. The transfer section R corresponds to a zone in which the zoom-photographing lens 11 moves between the zoom-photographing position (wide-angle extremity) and the accommodation position (retracted position). For the cylindrical cam surfaces 23C and 24C, the entirety of the transfer section R is defined by a linear profile (perpendicular to the optical axis) in which no movement of the movable variable power lenses 23 and 24 occurs. The light emission block 19 reaches a front movement limit in the zoom section Z. Thus the cylindrical cam surface 19C terminates at an intermediate portion of the zoom section Z. Namely, there is no cam surface 19C at the front portion of the zoom section Z.

The transfer section R of the cylindrical cam surface 19C comprises of a linear profile portion R1 similar to the cylindrical cam surfaces 23C and 24C, and an oblique cam portion (surface) R2 adjacent to the zoom section Z. The oblique cam portion R2 is inclined toward the zoom section Z with respect to the plane normal to the optical axis of the movable variable power lenses 23, 24, so that the oblique cam portion R2 smoothly connects the linear profile portion R1 and the zoom section Z. The cam follower (projection) 19P of the light emission block 19 is biased by the spring (not shown) toward the cylindrical cam surface 19C as mentioned above, and hence, when the cam follower 19P moves from the flat portion (linear portion) R1 to the oblique cam portion R2, a force in the direction perpendicular to the optical axis is exerted on the cylindrical cam 17 through the oblique cam portion R2.

When the zoom-photographing lens 11 is moved to the zoom-photographing position from the accommodation position (retracted position), the cam follower 19P moves from the flat surface portion R1 to the oblique cam portion R2 of the cylindrical cam 19C. While the cam follower 19P is in contact with the flat surface portion R1, no force in the direction perpendicular to the optical axis acts on the cylindrical cam 17. Once the cam follower 19P comes into contact with the oblique cam portion R2, a force in the direction normal to the optical axis is exerted on the cylindrical cam 17, so that a small rotation of the cylindrical cam 17, which is enough to eliminate the backlash, occurs due to the force. During the rotation of the cylindrical cam 17, no movement of the movable variable power lens 23 and 24 takes place, since the cam followers (projections) 23P and 24P thereof are in the transfer sections R (cylindrical cam surfaces 23C and 24C), respectively. Note that the small rotation of the cylindrical cam 17 causes the light emission block 19 to move in the optical axis direction, but the movement of the block is not visible, and hence no problem is caused by the movement of the light emission block 19. When the cam followers enter the zoom sections Z, the light emission block 19 and the movable variable power lenses 23 and 24 are moved in the optical axis direction in accordance with the cylindrical cam surfaces 19C, 23C and 24C.

The effect of the present invention will be apparent in comparison with the conventional transfer section 19CR having no oblique cam portion R2. As soon as the cam follower transfers from the transfer section 19CR into the zoom section Z, the cylindrical cam 17 to which no force in the direction perpendicular to the optical axis has been subjected, receives a force in the direction perpendicular to the optical axis through the cam followers (projections) 19P, 23P and 24P. Consequently, the cylindrical cam 17 rotates due to the backlash, so that a large displacement of the movable variable power lenses 23 and 24 occurs.

Contrary to this, in the present embodiment in which the transfer section R includes the oblique cam portion R2, since the cylindrical cam 17 rotates before the cam followers 23P or 24P enters the zoom section Z, the backlash is eliminated. Upon removal of the backlash, the cam followers 23P and 24P are still in the transfer sections R, and hence no movement of the movable variable power lenses 23 or 24 due to the backlash takes place.

The transfer section R (flat cam portion R1) of the cylindrical cam surface 19C is provided with a click groove 25 which is adapted to hold the cylindrical cam 17 in a reference position. Namely, upon incorporation (assembling) of the finder/strobe assembly having the zoom strobe device 12, the zoom finder 20 and the cylindrical cam 17 into the zoom compact camera 10, the cylindrical cam 17 is rotated to fit the cam follower 19P in the click groove 25 to hold the cylindrical cam 17 in the reference position. In the reference position, since the cam followers (projections) 23P and 24P of the movable variable power lenses 23 and 24 are correctly positioned in the transfer sections R of the cylindrical cam surfaces 23C and 24C (i.e., the cam followers are located on the flat cam portions), the association position of the movable variable power lenses in which the lenses are associated with the zoom-photographing lens 11 can be easily found to establish the association relationship. Namely, not only can the assembling operation be improved, but also failures of the lenses to associate are prevented.

Although the cylindrical cam surface 19C of the cylindrical cam 17 for the light emission block 9 is used as a backlash eliminating cam surface in the illustrated embodiment, it is possible to provide a backlash eliminating cam surface and a backlash eliminating member, regardless of the cylindrical cam surface 19C.

As may be understood from the above description, according to the present invention, a backlash eliminating apparatus can be provided in which no accidental movement of the movable variable power lenses of a zoom finder due to the backlash of the cam member takes place.

What is claimed is:

1. An apparatus for eliminating a backlash in a zoom finder, comprising:
   a zoom-photographing lens that is movable between a zoom photographing section and a transfer section defined between said zoom photographing section and an accommodation position;
   a zoom finder having at least one movable variable power lens that is supported to move in an optical axis direction;
   a cam member provided with a cam surface that is engaged with said movable variable power lens, said cam member being driven in association with said zoom-photographing lens, said cam surface being provided with a zoom section corresponding to said zoom photographing section of said zoom-photographing lens to vary an axial position of said movable power lens, and a transfer section corresponding to transfer section of said zoom-photographing lens, in which no movement of said movable variable power lens occurs;
   a backlash eliminating cam surface, separate from said cam surface on said cam member, for said movable variable power lens;
   an oblique cam surface provided on said backlash eliminating cam surface, said oblique cam surface being inclined with respect to a plane perpendicular to said optical axis of said movable variable power lens, and formed in a section corresponding to said zoom section side of said transfer section of said cam surface; and
   a backlash eliminating member which is continuously biased and pressed against said oblique cam surface to exert a drive force on said cam member in a direction perpendicular to said optical axis of said movable variable power lens.

2. A backlash eliminating apparatus according to claim 1, further comprising a zoom strobe device, wherein said backlash eliminating cam surface of said cam member comprises a zoom strobe cam surface which is adapted to move an illumination angle varying member of said zoom strobe device, and wherein said backlash eliminating member is formed by said illumination angle varying member.

3. A backlash eliminating apparatus according to claim 1, wherein said cam member is a cylindrical cam.

4. An apparatus for eliminating a backlash in a zoom finder of a zoom lens camera, comprising:
   a zoom finder having at least a pair of movable variable power lenses that are supported to move in an optical axis direction;
   a cylindrical cam provided with a pair of cam surfaces engaged with said pair of movable variable power lenses and a backlash eliminating cam surface separate from said pair of cam surfaces for said movable variable power lenses, said cylindrical cam being rotated in association with a zooming operation of said zoom lens camera;
   each of said pair of cam surfaces being provided with a zoom section to vary an axial position of the corresponding movable variable power lens, and a transfer section in which no movement of said movable variable power lenses occurs;
   said backlash eliminating cam surface being provided with an oblique cam surface, said oblique cam surface being inclined with respect to a plane perpendicular to said optical axis of said movable variable power lenses, and formed in a section corresponding to said zoom section side of said transfer section of said cam surface; and
   a backlash eliminating member which is continuously biased and pressed against said oblique cam surface to exert a rotational drive force on said cylindrical cam in a direction perpendicular to said optical axis of said movable variable power lens.

5. A backlash eliminating apparatus according to claim 4, further comprising a zoom strobe device, wherein said backlash eliminating cam surface of said cylindrical cam constitutes a zoom strobe cam surface which is adapted to move an illumination angle varying member of said zoom strobe device and wherein said backlash eliminating member is formed by said illumination angle varying member.

* * * * *